(12) United States Patent
Fu

(10) Patent No.: US 12,471,166 B2
(45) Date of Patent: Nov. 11, 2025

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Zhe Fu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 390 days.

(21) Appl. No.: 18/064,066

(22) Filed: Dec. 9, 2022

(65) Prior Publication Data

US 2023/0104242 A1 Apr. 6, 2023

Related U.S. Application Data

(63) Continuation of application No. PCT/CN2020/104946, filed on Jul. 27, 2020.

(51) Int. Cl.
*H04W 76/18* (2018.01)

(52) U.S. Cl.
CPC ................. *H04W 76/18* (2018.02)

(58) Field of Classification Search
None
See application file for complete search history.

(56) References Cited

U.S. PATENT DOCUMENTS

| | | | |
|---|---|---|---|
| 10,716,031 B2 | 7/2020 | Li | |
| 12,010,544 B2* | 6/2024 | Kuo | H04L 5/0044 |
| 12,069,638 B2* | 8/2024 | Bulakci | H04W 72/12 |
| 2015/0180786 A1* | 6/2015 | Chen | H04L 1/1678 |
| | | | 370/235 |
| 2019/0313287 A1 | 10/2019 | Li et al. | |
| 2020/0275509 A1* | 8/2020 | Yu | H04W 76/27 |
| 2022/0377596 A1* | 11/2022 | Kuo | H04L 69/324 |

FOREIGN PATENT DOCUMENTS

| | | |
|---|---|---|
| CN | 109257771 A | 1/2019 |
| CN | 110366257 A | 10/2019 |
| CN | 111327404 A | 6/2020 |
| CN | 11432440 A | 7/2020 |
| WO | 2020089851 A1 | 5/2020 |

OTHER PUBLICATIONS

Supplementary European Search Report in the European application No. 20947200.0, mailed on Apr. 6, 2023. 7 pages.

(Continued)

*Primary Examiner* — Eunsook Choi
(74) *Attorney, Agent, or Firm* — PERKINS COIE LLP

(57) ABSTRACT

Provided are a wireless communication method, a terminal device and a network device. The method comprises: a terminal device receiving a survival-time-related parameter of a first service; and the terminal device processing service transmission based on the survival-time-related parameter. As such the transmission success rate of a communication service can be improved.

12 Claims, 3 Drawing Sheets

(56) References Cited

OTHER PUBLICATIONS

CATT: "Survival time support in 5GS", 3GPP Draft; R2-1900159, 3rd Generation Partnership Project (3GPP), Mobilecompetence Centre; 650, Route Des Lucioles; F-06921 Sophia-Antipolis Cedex; France, vol. RAN WG2, No. Athens, Greece; Feb. 25, 2018-Nov. 1, 2018 Feb. 15, 2019 (Feb. 15, 2019), XP051601559. 6 pages.
CATT: "Survival time triggered PDCP duplication", 3GPP Draft; R2-1905752 Survival Time Triggered PDCP Duplication, 3rd Generation Partnership Project (3GPP), Mobilecompetence Centre; 650, Route Des Lucioles; F-06921 Sophia-Antipolis Cedex; France vol. RAN WG2, No. Reno, USA; May 13, 2019-May 17, 2019 May 13, 2019 (May 13, 2019), XP051729251. 4 pages.
Second Office Action of the European application No. 20947200.0, issued on Feb. 14, 2024. 5 pages.
Third Office Action of the European application No. 20947200.0, issued on Jun. 28, 2024. 6 pages.
Nokia, Nokia Shanghai Bell, CATT, Samsung, Huawei, HiSilicon, Apple, Ericsson, "KI#X, New Sol: Survival Time for Deterministic Applications", SA WG2 Meeting #139E S2-2004701, Jun. 1-12, 2020, Elbonia.
International Search Report in the international application No. PCT/CN2020/104946, mailed on Apr. 19, 2021.
English translation of the Written Opinion of the International Search Authority in the international application No. PCT/CN2020/104946, mailed on Apr. 19, 2021.
First Office Action of the European application No. 20947200.0, issued on Oct. 25, 2023, 5 pages.
First Office Action of the Chinese application No. 202080104594.4, issued on Dec. 18, 2024. 25 pages with English translation.
Second Office Action of the Chinese application No. 202080104594.4, issued on May 28, 2025. 26 pages with English translation.

\* cited by examiner

WIRELESS COMMUNICATION METHOD, TERMINAL DEVICE AND NETWORK DEVICE

REFERENCE TO RELATED APPLICATION

This is a continuation application of International Patent Application No. PCT/CN2020/104946 filed on Jul. 27, 2020, the disclosures of which are incorporated herein by reference in their entirety.

TECHNICAL FIELD

Embodiments of the disclosure relate to the field of communications, and more specifically, to a wireless communication method, a terminal device and a network device.

BACKGROUND

A Release (R) 17 Ultra Reliable and Low Latency Communications (URLLC) project requires a radio access network (RAN) to be enhanced on the basis of survival time of an application or a service.

Currently, the definition of survival time of a service is that, the survival time is defined by an Application Function (AF) by unit of time. The time here may be evaluated based on a burst periodicity (that is, a service cycle) or the maximum number of continuous message transmission errors (that is, failure). A message is a data package or an architecture, or a group of data packages or architectures included in an independent burst (that is, the burst periodicity). The message transmission error means that the message cannot meet a requirement for a packet delay budget (PDB). That is to say, for an application or a service, when the survival time is characterized by a service cycle and equals the service cycle, and after transmission of a data package fails, the next package to the data package is required to be correctly transmitted. Otherwise, a transmission error of the communication service occurs. Alternatively, for an application or a service, when the survival time is characterized by data packages that are continuously incorrectly transmitted, and the survival time equals X data packages that are continuously incorrectly transmitted, a transmission error of the communication service occurs when X continuous data packages are continuously incorrectly transmitted. As a result, when transmission of X−1 continuous data packages fails, the Xth data package is required to be correctly transmitted. In conclusion, when a service cannot meet the requirement of the survival time, failure of the communication service is caused.

SUMMARY

Embodiments of the disclosure provide a wireless communication method, a terminal device and a network device, to enhance the transmission success rate of a communication service.

A first aspect provides a wireless communication method. The method includes that a terminal device receives a survival-time-related parameter of a first service, and the terminal device processes service transmission based on the survival-time-related parameter.

A second aspect provides a wireless communication method. The method includes that a network device sends a survival-time-related parameter of a first service. The survival-time-related parameter is configured for a terminal device to process service transmission.

A third aspect provides a terminal device. The terminal device is configured to implement the method in the first aspect or each implementation thereof.

Specifically, the terminal device includes a functional module that is configured to implement the method in the first aspect or each implementation thereof.

A fourth aspect provides a network device. The network device is configured to implement the method in the second aspect or each implementation thereof.

Specifically, the network device includes a functional module that is configured to implement the method in the second aspect or each implementation thereof.

A fifth aspect provides a terminal device, including a processor and a memory. The memory is configured to store the computer program. The processor is configured to call and run the computer program stored in the memory, so as to implement the method in the first aspect or each implementation thereof.

A sixth aspect provides a network device, including a processor and a memory. The memory is configured to store the computer program. The processor is configured to call and run the computer program stored in the memory, so as to implement the method in the second aspect or each implementation thereof.

A seventh aspect provides an apparatus. The apparatus is configured to implement the method in any one of the first aspect to the second aspect or each implementation thereof.

Specifically, the apparatus includes: a processor, configured to call and run a computer program from a memory, to cause a device having the apparatus mounted to implement the method in any one of the first aspect to the second aspect or each implementation thereof.

An eighth aspect provides a computer-readable storage medium. The computer-readable storage medium is configured to store a computer program. The computer program causes a computer to execute the method in any one of the first aspect to the second aspect or each implementation thereof.

A ninth aspect provides a computer program product. The computer program product includes a computer program instruction. The computer program instruction causes a computer to execute the method in any one of the first aspect to the second aspect or each implementation thereof.

A tenth aspect provides a computer program. When the computer program is run on a computer, the computer executes the method in any one of the first aspect to the second aspect or each implementation thereof.

By means of the technical solutions in the first aspect or the second aspect, the terminal device may process service transmission based on the survival-time-related parameter. That is to say, when the survival-time-related parameter meets a corresponding preset condition, the terminal device may process the service transmission, so as to enhance the transmission success rate of a communication service.

DETAILED DESCRIPTION

The technical solutions in the embodiments of the disclosure will be described below with reference to the drawings in the embodiments of the disclosure. It is apparent that the described embodiments are only part of the embodiments of the disclosure, not all the embodiments. All the embodiments obtained by those of ordinary skill in the art on the basis of the embodiments in this disclosure without creative work all fall within the scope of protection of this disclosure.

The embodiments of the disclosure are applicable to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, an New Radio (NR) system, an evolution system of the NR system, an LTE-based Access to Unlicensed Spectrum (LTE-U) system, a NR-based Access to Unlicensed Spectrum (NR-U) system, a Universal Mobile Telecommunications System (UMTS), a Wireless Local Area Network (WLAN), Wireless Fidelity (WiFi), a next generation of communication systems, or other communication systems.

Generally, the number of connections that is supported by a conventional communication system is limited and is easy to achieve. However, with the development of a communication technology, a mobile communication system not only supports traditional communication, but also supports, for example, Device to Device (D2D) communication, Machine to Machine (M2M) communication, Machine Type Communication (MTC), and Vehicle to Vehicle (V2V) communication. The embodiments of the disclosure can also be applied to these communication systems.

In the embodiments of the disclosure, the communication system may be applied to a carrier aggregation (CA) scenario, or may be applied to a dual connectivity (DC) scenario, or may be applied to a standalone (SA) networking scenario.

In the embodiments of the disclosure, an applied spectrum is not limited. For example, the embodiments of the disclosure may be applied to a licensed spectrum or an unlicensed spectrum.

Figure 1:
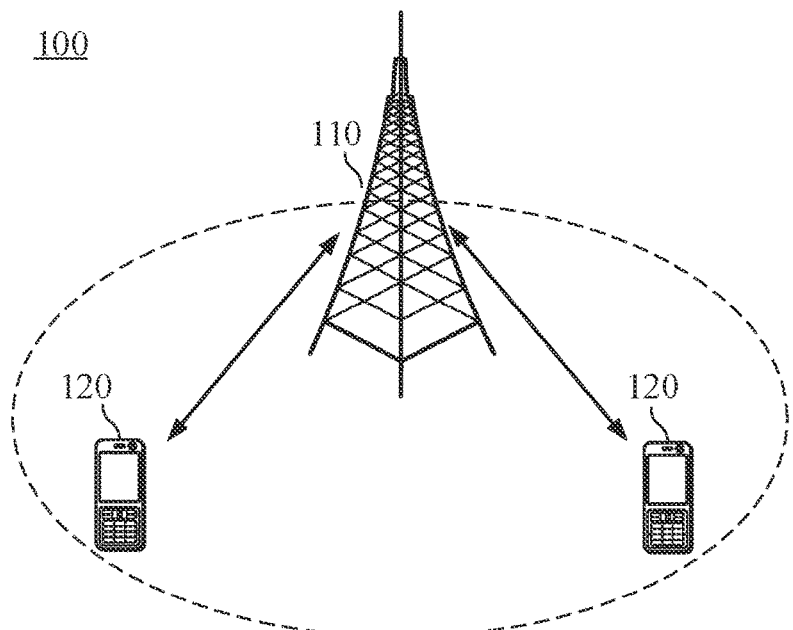
FIG. 1 is a schematic diagram of a communication system architecture according to an embodiment of the disclosure.

Exemplarily, a communication system 100 applied in an embodiment of the disclosure is shown in FIG. 1. The communication system 100 may include a network device 110. The network device 110 may be a device communicating with a terminal device 120 (or called a communication terminal or a terminal). The network device 110 may provide communication coverage for a specific geographical region, and may communicate with the terminal device located in the coverage region.

FIG. 1 exemplarily shows a network device and two terminal devices. The communication system 100 may include a plurality of network devices, and the coverage of each network device may include other numbers of terminal devices. The embodiments of the disclosure are not limited thereto.

In some embodiments, the communication system 100 may further include other network entities such as a network controller and a mobile management entity. The embodiments of the disclosure are not limited thereto.

It is to be understood that, a device having a communication function in a network/system in the embodiments of the disclosure may be called as a communication device. By using the communication system 100 shown in FIG. 1 as an example, the communication device may include a network device 110 having a communication function and a terminal device 120. The network device 110 and the terminal device 120 may be specific devices described above, which are not described herein again. The communication device may further include other devices in the communication system 100, such as other network entities such as a network controller and a mobile management entity. The embodiments of the disclosure are not limited thereto.

It is to be understood that, terms "system" and "network" in the disclosure may usually be exchanged in the disclosure. The term "and/or" in the disclosure is merely an association relationship describing related objects, which means that there may be three relationships, for example, A and/or B may indicate three cases: A exists alone, A and B exist simultaneously, and B exists alone. In addition, the character "/" herein indicates that the related objects are in an "or" relationship.

In the embodiments of the disclosure, the embodiments are described by combining a terminal device with a network device. The terminal device may also be called a User Equipment (UE), an access terminal, a user unit, a user station, a mobile station, a mobile platform, a remote station, a remote terminal, a mobile device, a user terminal, a terminal, a wireless communication device, a user agent, or a user device. The terminal device may be a STAION (ST) in the WLAN, or may be a cellular phone, a cordless phone, a Session Initiation Protocol (SIP) phone, a Wireless Local Loop (WLL) station, a Personal Digital Assistant (PDA) device, a handheld device having a wireless communication function, a computing device or another processing device of a wireless modem, a vehicle device, a wearable device or a next generation of communication systems, for example, a terminal device in an NR network, or a terminal device in a future evolved Public Land Mobile Network (PLMN).

As an example rather than a limitation, in the embodiments of the disclosure, the terminal device may be a wearable device. The wearable device may also be called a wearable intelligent device, which is a generic term of daily wearable devices that are intelligently designed and developed by means of a wearable technology, for example, glasses, gloves, watches, clothing and shoes. The wearable device is a portable device that is directly worn on the body or integrated into the clothes or accessories of a user. The wearable device is not only a hardware device, but also achieves powerful functions by means of software support, data interaction, and cloud interaction. In a broad sense, the wearable intelligent device includes complete or partial functions that are complete in function and large in size, and are implemented without relying on smart phones, for example, a smart watch or smart glasses, and various smart wristbands or smart ornaments for physical sign monitoring that only concentrate on a certain disclosure function and are required to be used by cooperating with other devices such as the smart phones.

The network device may be a device that is configured to communicate with a mobile device. The network device may be an Access Point (AP) in the WLAN, GSM or a Base Transceiver Station (BTS) in the CDMA, or may be NodeB (NB) in the WCDMA, or may also be an Evolutional Node B (eNB or eNodeB) in the LTE, or a relay station or access point, or the vehicle device, the wearable device, and a network device in the NR network or the gNBs or a network device in a future evolved PLMN network, or the like.

In the embodiments of the disclosure, the network device provides a service for a cell. The terminal device may communicate with the network device by means of a transmission resource (for example, a frequency domain resource, or to say, a spectrum resource) used by the cell. The cell may be a cell corresponding to the network device (such as a base station). The cell may belong to a macro base station, or may belong to a base station corresponding to a small cell. The small cell here may include a metro cell, a micro cell, a pico cell, a femto cell, and the like. These small cells have characteristics such as small coverage and low transmitting power, and are suitable for providing high-speed data transmission services.

An International Telecommunication Union (ITU) is a 5 Generation (5G) mobile communication system; and the future mobile communication system defines three types of application scenarios: an Enhanced Mobile Broadband (eMBB), Ultra Reliable and Low Latency Communications (URLLC), and massive Machine Type Communications (mMTC). Typical eMBB services include: ultra-high-definition videos, Augmented Reality (AR), Virtual Reality (VR), and the like. These services have such main characteristics as a large amount of transmitted data and a high transmission speed. Typical URLLC services include: wireless control in industrial manufacturing or production processes, motion control of driverless cars and unmanned aerial vehicles, and haptic interaction applications such as remote repairing and remote surgery. These services require ultra-high reliability, low latency, small amount of data transmitted, and burstiness. Typical mMTC services include: smart grid distribution automation, smart city, and the like. The services have such main characteristics as huge number of networking devices, small amount of transmitted data, and insensitive transmission latency of data. These mMTC terminals are required to meet requirements of low cost and very long standby time.

As described above, an R17 URLLC project requires an RAN to be enhanced on the basis of survival time of an application or a service. When the service cannot meet the requirement of the survival time, failure of the communication service is caused.

In order to resolve the above technical problems, in the disclosure, service transmission is processed based on a survival-time-related parameter, so as to enhance the transmission success rate of a communication service.

The technical solutions of the disclosure are described in detail below with reference to specific embodiments.

Figure 2:
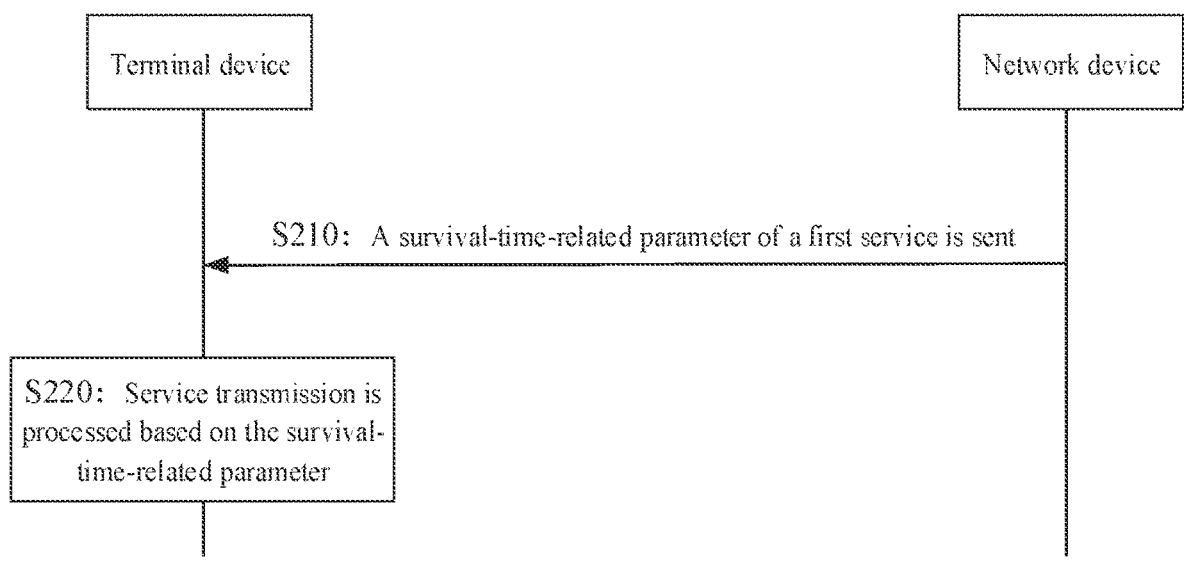
FIG. 2 is an interaction flowchart of a wireless communication method according to an embodiment of the disclosure.

FIG. 2 is an interaction flowchart of a wireless communication method according to an embodiment of the disclosure. The method includes the following operations.

At S210, a network device sends a survival-time-related parameter of a first service to a terminal device.

At S220, the terminal device processes service transmission based on the survival-time-related parameter.

S210 is described below.

In some embodiments, the first service may be a service of any one of following levels: a terminal device level, a data radio bear (DRB) level, a quality of service (QoS) flow level, a protocol data unit (PDU) session level, a time sensitive network (TSN) stream level, or a data package level.

In this embodiment of the disclosure, the terminal device level refers to a level for a certain terminal device. Then the first service of the terminal device level is a first service for a certain terminal device. For example, the first service is a service of terminal device 1.

In this embodiment of the disclosure, the DRB level refers to a level for a certain DRB. Then the first service of the DRB level is a first service for a certain DRB. For example, the first service is a service of DRB 1.

In this embodiment of the disclosure, the QoS flow level refers to a level for a certain QoS flow. Then the first service of the QoS flow level is a first service for a certain QoS flow. For example, the first service is a service of QoS flow 1.

In this embodiment of the disclosure, the PDU session level refers to a level for a certain PDU session. Then the first service of the PDU session level is a first service for a certain PDU session. For example, the first service is a service of PDU session 1.

In this embodiment of the disclosure, the TSN stream level refers to a level for a certain TSN stream. Then the first service of the TSN stream level is a first service for a certain TSN stream. For example, the first service is a service of TSN stream 1.

In this embodiment of the disclosure, the data package level refers to a level for a certain data package. Then the first service of the data package level is a first service for a certain data package. For example, the first service is a service of data package 1.

In some embodiments, the survival-time-related parameter may include at least one of followings: a DRB identifier, a QoS flow identifier, a TSN stream identifier, a PDU session identifier, survival time, a preset threshold for the survival time, burst periodicity, burst arrival time, and a first PDB.

In some embodiments, when the first service is at the DRB level, the survival-time-related parameter may include the DRB identifier, and may or may not include the QoS flow identifier, the TSN stream identifier and the PDU session identifier.

In some embodiments, when the first service is at the QoS flow level, the survival-time-related parameter may include the QoS flow identifier, and may or may not include the DRB identifier, the TSN stream identifier and the PDU session identifier.

In some embodiments, when the first service is at the TSN stream level, the survival-time-related parameter may include the TSN stream identifier, and may or may not include the DRB identifier, the QoS flow identifier and the PDU session identifier.

In some embodiments, when the first service is at the data package level, the survival-time-related parameter may or may not include the DRB identifier, the QoS flow identifier, the TSN stream identifier and the PDU session identifier.

In some embodiments, the survival-time-related parameter may be carried in dedicated signaling or a broadcast message.

In some embodiments, the dedicated signaling may be any one of followings: radio resource control (RRC) signaling, media access control control element (MAC CE) signaling, and downlink control information (DCI).

In some embodiments, the preset threshold may be configured for the terminal device by the network device according to network actual situations. In the disclosure, the manner of determining the preset threshold is not limited.

S220 is described below.

In some embodiments, the terminal device may process the service transmission when the survival-time-related parameter meets a corresponding preset condition. Details include any one of followings, but are not limited thereto.

1) In response to that the survival time is configured or indicated, the terminal device processes the service transmission.

2) In response to that the survival time is configured or indicated, and the survival time and the preset threshold meet a first preset condition, the terminal device processes the service transmission. Alternatively, 3) in response to that the survival time is configured or indicated, and the survival time, the preset threshold, transmission latency of a data package and the first PDB meet a second preset condition, the terminal device processes the service transmission.

4) In response to that the survival time is configured or indicated, and the survival time, the preset threshold, transmission latency of the service cycle and the first PDB meet a third preset condition, the terminal device processes the service transmission.

5) In response to that the survival time is configured or indicated, and the survival time, the preset threshold, the number of the service cycles and the first PDB meet a fourth preset condition, the terminal device processes the service transmission.

6) In response to that the survival time is configured or indicated, and the survival time, the preset threshold, the transmission latency of the data package within the service cycle and the first PDB meet a fifth preset condition, the terminal device processes the service transmission.

7) In response to that the survival time is configured or indicated, and the survival time, the preset threshold, the number of the data packages and the first PDB meet a sixth preset condition, the terminal device processes the service transmission.

8) In response to that the survival time is configured or indicated, and the survival time, the preset threshold and the burst periodicity meet a seventh preset condition, the terminal device processes the service transmission.

9) In response to that the survival time is configured or indicated, and the survival time, the preset threshold and the burst arrival time meet an eighth preset condition, the terminal device processes the service transmission.

It should be understood that, the case that the survival time is configured or indicated means that the survival-time-related parameter includes survival time.

In an optional manner of 1), as long as the survival-time-related parameter includes the survival time, the terminal device may process the service transmission. On the contrary, when the survival-time-related parameter does not include the survival time, the terminal device does not process the service transmission.

In some embodiments, the first preset condition may include any one of followings:
  the survival time equals X service cycles, where X is less than or equal to the preset threshold, or X is greater than or equal to the preset threshold, where X is an integer greater than or equal to 1;
  the survival time equals X service cycles, where the X service cycles are less than or equal to the preset threshold, or the X service cycles are greater than or equal to the preset threshold, where X is an integer greater than or equal to 1;
  the survival time equals a transmission duration of Y continuously incorrect data packages, where Y is less than or equal to the preset threshold, or Y is greater than or equal to the preset threshold, where Y is an integer greater than or equal to 1; and
  the survival time equals Y continuously incorrect data packages, where Y is less than or equal to the preset threshold, or Y is greater than or equal to the preset threshold, where Y is an integer greater than or equal to 1.

In some embodiments, the second preset condition may include any one of followings:
  the survival time equals X service cycles, and transmission latency of K data packages or K continuous data packages is greater than or equal to the first PDB, where K is greater than or equal to the preset threshold, or K equals X, where X is an integer greater than or equal to 1;
  the survival time equals a transmission duration of Y continuously incorrect data packages, and transmission latency of K data packages or K continuous data packages is greater than or equal to the first PDB, where K is greater than or equal to the preset threshold, or K is less than or equal to Y, where Y is an integer greater than or equal to 1; and
  the survival time equals Y continuously incorrect data packages, and transmission latency of K data packages or K continuous data packages is greater than or equal to the first PDB, where K is greater than or equal to the preset threshold, or K is less than or equal to Y, where Y is an integer greater than or equal to 1.

In some embodiments, the third preset condition may include any one of followings:
  the survival time equals X service cycles, and transmission latency of K service cycles or K continuous service cycles is greater than or equal to the first PDB, where K is greater than or equal to the preset threshold, or K equals X, where X is an integer greater than or equal to 1;
  the survival time equals a transmission duration of Y continuously incorrect data packages, and transmission latency of K service cycles or K continuous service cycles is greater than or equal to the first PDB, where K is greater than or equal to the preset threshold, or K is less than or equal to Y, where Y is an integer greater than or equal to 1; and
  the survival time equals Y continuously incorrect data packages, and transmission latency of K service cycles or K continuous service cycles is greater than or equal to the first PDB, where K is greater than or equal to the preset threshold, or K is less than or equal to Y, where Y is an integer greater than or equal to 1.

In some embodiments, one data package may be transmitted in one service cycle.

In some embodiments, the fourth preset condition may include any one of followings:
  the survival time equals X service cycles, and there are K service cycles or K continuous service cycles of which transmission latency is greater than or equal to the first PDB, where K is greater than or equal to the preset threshold, or K equals X, where X is an integer greater than or equal to 1;
  the survival time equals a transmission duration of Y continuously incorrect data packages, and there are K service cycles or K continuous service cycles of which transmission latency is greater than or equal to the first PDB, where K is greater than or equal to the preset threshold, or K is less than or equal to Y, where Y is an integer greater than or equal to 1; and
  the survival time equals Y continuously incorrect data packages, and there are K service cycles or K continuous service cycles of which transmission latency is greater than or equal to the first PDB, where K is greater than or equal to the preset threshold, or K is less than or equal to Y, where Y is an integer greater than or equal to 1.

In some embodiments, the fifth preset condition may include any one of followings:

the survival time equals X service cycles, and transmission latency of data packages within K service cycles or K continuous service cycles is greater than or equal to the first PDB, where K is greater than or equal to the preset threshold, or K equals X, where X is an integer greater than or equal to 1;

the survival time equals the transmission duration of Y continuously incorrect data packages, and transmission latency of data packages within K service cycles or K continuous service cycles is greater than or equal to the first PDB, where K is greater than or equal to the preset threshold, or K is less than or equal to Y, where Y is an integer greater than or equal to 1; and the survival time equals Y continuously incorrect data packages, and transmission latency of data packages within K service cycles or K continuous service cycles is greater than or equal to the first PDB, where K is greater than or equal to the preset threshold, or K is less than or equal to Y, where Y is an integer greater than or equal to 1.

In some embodiments, the sixth preset condition may include any one of followings.

the survival time equals X service cycles, and there are K data packages or K continuous data packages of which transmission latency is greater than or equal to the first PDB, where K is greater than or equal to the preset threshold, or K equals X, where X is an integer greater than or equal to 1;

the survival time equals X service cycles, and there are data packages within K service cycles or K continuous service cycles of which transmission latency is greater than or equal to the first PDB, where K is greater than or equal to the preset threshold, or K equals X, where X is an integer greater than or equal to 1;

the survival time equals a transmission duration of Y continuously incorrect data packages, and there are K data packages or K continuous data packages of which transmission latency is greater than or equal to the first PDB, where K is greater than or equal to the preset threshold, or K is less than or equal to Y, where Y is an integer greater than or equal to 1; and the survival time equals Y continuously incorrect data packages, and there are K data packages or K continuous data packages of which transmission latency is greater than or equal to the first PDB, where K is greater than or equal to the preset threshold, or K is less than or equal to Y, where Y is an integer greater than or equal to 1.

For the sake of simplicity, in the disclosure, the burst periodicity included in the survival-time-related parameter is called first burst periodicity. Based on this, the seventh preset condition may be that: the survival time equals X service cycles, and the burst periodicity of the K data packages or K continuous data packages is greater than or equal to the first burst periodicity, where K is greater than or equal to the preset threshold, or K equals X, where X is an integer greater than or equal to 1.

For the sake of simplicity, in the disclosure, the burst arrival time included in the survival-time-related parameter is called first burst arrival time. Based on this, the eighth preset condition may be that: the survival time equals X service cycles, and the burst arrival time of the K data packages or K continuous data packages is greater than or equal to the first burst arrival time, where K is greater than or equal to the preset threshold, or K equals X, where X is an integer greater than or equal to 1.

It should be understood that, at least one of the above items in the first preset condition to the eighth preset condition may be configured for the terminal device by the network device by means of dedicated signaling or a broadcast message.

In some embodiments, the dedicated signaling for the first preset condition to the eighth preset condition may be any one of followings: RRC signaling, MAC CE signaling, or DCI.

In some embodiments, time of the service transmission may be determined based on the burst arrival time and/or the first burst periodicity, so as to determine whether the survival time meets requirements.

In some embodiments, the terminal device may process the service transmission at any one of following levels: a terminal device level, a DRB level, a PDU session level, a TSN stream level, or a data package level.

In some embodiments, the terminal device may further receive first indication information. The first indication information is configured to instruct the terminal device to process the service transmission based on the survival-time-related parameter. Based on this, the terminal device may process the service transmission based on the first indication information and the survival-time-related parameter.

In some embodiments, the network device may send the first indication information and the survival-time-related parameter together to the terminal device, for example, carrying the first indication information and the survival-time-related parameter in the RRC signaling, the MAC CE, or the DCI. Definitely, the network device may separately send the first indication information and the survival-time-related parameter to the terminal device. For example, the first indication information may be carried in two different RRC signaling, or carried in two different MAC CEs, or carried in two different pieces of DCI. Alternatively, the first indication information may be carried in the RRC signaling, and the survival-time-related parameter may be carried in the MAC CE or the DCI. In conclusion, in the disclosure, the manner that the network device sends the first indication information and the survival-time-related parameter is not limited.

To sum up, according to the wireless communication method provided in the disclosure, the terminal device may process service transmission based on the survival-time-related parameter. That is to say, when the survival-time-related parameter meets a corresponding preset condition, the terminal device processes the service transmission, so as to enhance the transmission success rate of a communication service.

As described above, the terminal device processes the service transmission. Processing the service transmission by the terminal device is described in detail below.

In some embodiments, processing the service transmission by the terminal device may include at least one of following items.

1) the terminal device selects a transmission resource that is to be first transmitted;
2) the terminal device selects or adjusts a mapping limit parameter of a logical channel (LCH);
3) the terminal device selects or adjusts a mapping parameter of the LCH;
4) the terminal device selects or adjusts a transmission parameter;

5) the terminal device activates a duplicate transmission mode;
6) the terminal device selects or adjusts a carrier wave;
7) the terminal device selects or adjusts a bandwidth part (BWP);
8) the terminal device determines whether to report a transmission state; and
9) the terminal device reports the transmission state.

It should be understood that, processing the service transmission by the terminal device may be implemented when the survival-time-related parameter of the terminal device meets a corresponding preset condition. Definitely, processing the service transmission by the terminal device is not limited by a fact that whether the survival-time-related parameter of the terminal device meets a corresponding preset condition. The disclosure is not limited thereto.

The item 1) is described below.

In some embodiments, the transmission resource may include any one of followings: a media access control (MAC) PDU, a physical-layer transmission resource, and a transmission grant.

In some embodiments, the transmission resource that is to be first transmitted may be or may not be the transmission resource of the first service. For example, when there is the first service meeting the first preset condition, the second preset condition, the third preset condition, the fourth preset condition, the fifth preset condition, the sixth preset condition, the seventh preset condition or the eighth preset condition, the transmission resource for the first service may be first transmitted. For another example, when there are a plurality of services meeting the first preset condition, the second preset condition, the third preset condition, the fourth preset condition, the fifth preset condition, the sixth preset condition, the seventh preset condition or the eighth preset condition, the terminal device may select, according to a priority rule of LCHs corresponding to the services, a transmission resource that is to be first transmitted.

In some embodiments, the terminal device may select a transmission resource of a service corresponding to a highest-priority LCH from the at least one service that meets the first preset condition to the eighth preset condition as the transmission resource that is to be first transmitted.

In some embodiments, the priority rule may be an LCH priority rule in R16, or may be an LCH priority rule in R15. The disclosure is not limited thereto.

It is to be noted that, when the survival-time-related parameter does not meet any one of the first preset condition to the eighth preset condition, the terminal device may select, according to the LCH priority rule in R16 or the LCH priority rule in R15, a transmission resource that is to be first transmitted.

The item 2) is described below.

In some embodiments, the mapping limit parameter may include any one of followings: a type of the transmission resource, an allowed serving cell parameter (allowedServingCells), an allowed configured grant list (allowedCG-List), and an allowed physical layer priority index (allowedPHY-PriorityIndex).

In some embodiments, the type of the transmission resource may be configured Grant Type 1.

In some embodiments, priority of physical-layer resources may be different. Some LCHs may be transmitted on a high-priority physical-layer resource, and some LCHs may be transmitted on a low-priority physical-layer resource. Therefore, the allowedPHY-PriorityIndex is used to indicate on which physical-layer resource the first service may be transmitted.

In some embodiments, the selected or adjusted mapping limit parameter is used to map the LCH into all transmission resources or a first resource set. The transmission resource here is a physical-layer transmission resource, and the first resource set is also a physical-layer transmission resource set. Or the transmission resource here may be an MAC-layer transmission resource (for example, a MAC PDU or an Uplink Shared Channel (UL-SCH)), and the first resource set may be also an MAC-layer transmission resource (for example, a MAC PDU or UL-SCH) set.

In some embodiments, there may be a correspondence between the LCH and the first resource set.

In some embodiments, the correspondence between the LCH and the first resource set and/or the first resource set may be pre-configured or indicated by the network device.

In some embodiments, the network device may indicate the correspondence between the LCH and the first resource set and/or the first resource set by means of RRC signaling, a MAC CE, or DCI.

It is to be noted that, when the survival-time-related parameter does not meet any one of the first preset condition to the eighth preset condition, the terminal device may use an existing rule of mapping from a LCH to a transmission resource to map the LCH onto a corresponding transmission resource.

The item 3) is described below.

In some embodiments, the mapping parameter may include any one of followings: priority of the LCH, a prioritised bit rate of the LCH, a bucket size duration (BSD) of the LCH.

In some embodiments, the selected or adjusted mapping parameter may be pre-configured or indicated by the network device.

In some embodiments, the network device may indicate the selected or adjusted mapping parameter by means of RRC signaling, a MAC CE, or DCI.

It is to be noted that, when the survival-time-related parameter does not meet any one of the first preset condition to the eighth preset condition, the terminal device may use an existing LCH mapping parameter to map the LCH onto a corresponding transmission resource.

The item 4) is described below.

In some embodiments, the transmission parameter may include any one of followings: a modulation and coding scheme (MCS), the number of repeated transmissions of the data packages, the number of duplicate transmissions of the data packages, and an indication parameter about whether to use duplicate transmission.

In some embodiments, when the first service meets any one of the first preset condition to the eighth preset condition, the indication parameter about whether to use duplicate transmission is used to indicate an indication parameter regarding the use of duplicate transmission. In some embodiments, the selected or adjusted transmission parameter may be pre-configured or indicated by the network device.

In some embodiments, the network device may indicate the selected or adjusted transmission parameter by means of RRC signaling, a MAC CE, or DCI.

It is to be noted that, when the survival-time-related parameter does not meet any one of the first preset condition to the eighth preset condition, the terminal device may use an existing transmission parameter to perform the service transmission.

The item (5) is described below.

In some embodiments, the duplicate transmission mode may be a transmission mode of any one of following levels:

a terminal device level, a DRB level, a QoS flow level, a data package level, a TSN stream level, and a PDU session level.

In some embodiments, the level of the duplicate transmission mode may be pre-configured or indicated by the network device.

In some embodiments, the network device may indicate the duplicate transmission mode by means of RRC signaling, a MAC CE, or DCI.

In some embodiments, when the first service meets any one of the first preset condition to the eighth preset condition, a duplicate transmission mechanism may be used.

It is to be noted that, when the survival-time-related parameter does not meet any one of the first preset condition to the eighth preset condition, the terminal device may performs the service transmission in a manner of deactivating duplicate transmission.

The item (6) is described below.

In some embodiments, the selected or adjusted carrier wave may be pre-configured or indicated by the network device.

In some embodiments, the selected or adjusted carrier wave may be determined by the terminal device.

In some embodiments, the network device may indicate the selected or adjusted carrier wave by means of RRC signaling, a MAC CE, or DCI.

It is to be noted that, when the survival-time-related parameter does not meet any one of the first preset condition to the eighth preset condition, the terminal device may use an existing carrier wave to perform the service transmission.

The item (7) is described below.

In some embodiments, the selected or adjusted BWP may be pre-configured or indicated by the network device.

In some embodiments, the selected or adjusted BWP may be determined by the terminal device.

In some embodiments, the network device may indicate the selected or adjusted BWP by means of RRC signaling, a MAC CE, or DCI.

It is to be noted that, when the survival-time-related parameter does not meet any one of the first preset condition to the eighth preset condition, the terminal device may use an existing BWP to perform the service transmission.

It should be understood that, in the disclosure, the "selection" of a certain or a group of parameters means that a parameter is selected from at least one parameter, or a group of parameters is selected from at least one group of parameters. "Adjustment" means that, when there is one or one group of parameters, the one or one group of parameters may be adjusted, so as to obtain another or another group of adjusted parameters.

Items (8) and (9) are described below.

In some embodiments, the transmission state may include at least one of following items:

1. indicating that transmission latency of a first data package is greater than or equal to the first PDB;
2. indicating that there is the first data package of which the transmission latency is greater than or equal to the first PDB;
3. indicating that the transmission latency of the K data packages or K continuous data packages is greater than or equal to the first PDB is indicated. K is greater than or equal to the preset threshold for the survival time, or K equals X, where X is the number of the service cycles included in the survival time, where X is an integer greater than or equal to 1;
4. indicating that the transmission latency of the K data packages or K continuous data packages is greater than or equal to the first PDB is indicated. K is greater than or equal to the preset threshold, or K is less than or equal to Y, where Y is the number of the continuously incorrect data packages included in the survival time, where Y is an integer greater than or equal to 1;
5. indicating that transmission latency of a first service cycle is greater than or equal to the first PDB;
6. indicating that there is the first service cycle of which the transmission latency is greater than or equal to the first PDB;
7. indicating that the transmission latency of the K service cycles or K continuous service cycles is greater than or equal to the first PDB is indicated. K is greater than or equal to the preset threshold for the survival time, or K equals X, where X is the number of the service cycles included in the survival time, where X is an integer greater than or equal to 1;
8. indicating that there are K service cycles or K continuous service cycles of which transmission latency is greater than or equal to the first PDB is indicated. K is greater than or equal to the preset threshold for the survival time, or K equals X, where X is the number of the service cycles included in the survival time, where X is an integer greater than or equal to 1;
9. indicating that transmission latency of a data package within the first service cycle is greater than or equal to the first PDB;
10. indicating that the transmission latency of the data packages within the K service cycles or K continuous service cycles is greater than or equal to the first PDB is indicated. K is greater than or equal to the preset threshold for the survival time, or K equals X, where X is the number of the service cycles included in the survival time, where X is an integer greater than or equal to 1;
11. indicating that there are K data packages or K continuous data packages of which transmission latency is greater than or equal to the first PDB is indicated. K is greater than or equal to the preset threshold, or K equals X, where X is the number of the service cycles included in the survival time, where X is an integer greater than or equal to 1;
12. indicating that there are data packages within K service cycles or K continuous service cycles of which transmission latency is greater than or equal to the first PDB is indicated. K is greater than or equal to the preset threshold, or K equals X, where X is the number of the service cycles included in the survival time, where X is an integer greater than or equal to 1;
13. indicating that there are K data packages or K continuous data packages of which transmission latency is greater than or equal to the first PDB is indicated. K is greater than or equal to the preset threshold, or K is less than or equal to Y, where Y is the number of the continuously incorrect data packages included in the survival time, where Y is an integer greater than or equal to 1;
14. indicating that the first service does not meet a PDB requirement;
15. indicating that the first service does not meet a duration of the first PDB;
16. indicating that the first service does not meet a cumulative duration of the first PDB; and
17. indicating that the first service does not meet a survival-time requirement.

The first data package may be any data package of the first service.

The first service cycle may be any service cycle of the first service.

In some embodiments, the parameter selected by the terminal device or the adjusted parameter information may also be indicated. The selection or adjustment may include at least one of followings.
1) selecting, by the terminal device, a transmission resource that is to be first transmitted;
2) selecting or adjusting, by the terminal device, a mapping limit parameter of the LCH;
3) selecting or adjusting, by the terminal device, a mapping parameter of the LCH;
4) selecting or adjusting, by the terminal device, a transmission parameter;
5) activating, by the terminal device, a duplicate transmission mode;
6) selecting or adjusting, by the terminal device, a carrier wave; and
7) selecting or adjusting, by the terminal device, a BWP.

It is to be noted that, the item 14 actually includes at least one of item 1 to item 13. The item 15 includes at least one of the item 1, item 2, item 5, item 6, and item 9. The item 16 includes at least one of the item 3, the item 4, the item 7, the item 8, or the item 10 to the item 13.

The first service does not meet the survival-time requirement. That is to say, according to the definition of the survival time, for an application or a service, when the survival time is characterized by a service cycle and equals the service cycle, and after transmission of a data package fails, the next package to the data package is required to be correctly transmitted. Otherwise, the survival-time requirement is not met, resulting in an error in the transmission of the communication service. Alternatively, for an application or a service, when the survival time is characterized by data packages that are continuously incorrectly transmitted, the survival time equals X data packages that are continuously incorrectly transmitted, and when X continuous data packages are continuously incorrectly transmitted, the survival-time requirement is not met, resulting in an error in the transmission of the communication service.

In some embodiments, in response to determining by the terminal device that the transmission latency of the first data package is greater than or equal to the first PDB, the terminal device may drop the first data package. In response to determining by the terminal device that the transmission latency of the K data packages or K continuous data packages is greater than or equal to the first PDB, the terminal device may drop the K data packages or K continuous data packages. In response to determining by the terminal device that the transmission latency of the first service cycle is greater than or equal to the first PDB, the terminal device may drop the data package of the first service cycle. In response to determining by the terminal device that the transmission latency of the K service cycles or K continuous service cycles is greater than or equal to the first PDB, the terminal device may drop the data packages within the K service cycles or K continuous service cycles. In response to determining by the terminal device that transmission latency of a data package within the first service cycle is greater than or equal to the first PDB, the terminal device may drop the data package of the first service cycle. In response to determining by the terminal device that the transmission latency of the data packages within the K service cycles or K continuous service cycles is greater than or equal to the first PDB, the terminal device may drop the data packages within the K service cycles or K continuous service cycles. In response to determining by the terminal device that the first service does not meet the PDB requirement, the terminal device may drop the data package of the first service or may drop a data package that does not meet the PDB requirement. In response to determining by the terminal device that the first service does not meet a duration of the first PDB, the terminal device may drop the data package of the first service or may drop a data package that does not meet the duration of the first PDB. In response to determining by the terminal device that the first service does not meet a cumulative duration of the first PDB, the terminal device may drop the data package of the first service or may drop a data package that does not meet the cumulative duration of the first PDB. In response to determining the first service by the terminal device to not meet the survival-time requirement, the terminal device may drop the data package of the first service or may drop a data package that does not meet the survival-time requirement.

In some embodiments, the K data packages or K continuous data packages may be data packages of any one of following levels: a terminal device level, a DRB level, a QoS flow level, a TSN stream level, and a PDU session level.

In some embodiments, the data package may be dropped by the terminal device in at least one of following protocol layers: a packet data convergence protocol (PDCP) layer, a radio link control (RLC) layer, and an MAC layer.

In some embodiments, the transmission state may include at least one of followings: time of sending the data package; transmission latency or cumulative transmission latency, calculated by the terminal device, of the data package; and feedback information of the data package.

It is to be understood that, the time of sending the data package may be the time of sending one or more data packages of the first service.

In some embodiments, the time of sending one data package may include initial transmission time and/or retransmission time of the data package.

It is to be noted that, the initial transmission time of the data package may also be described as the first transmission time or the first time for sending the data package. The retransmission time of the data package may also be described as the time of re-sending the data package. The disclosure is not limited thereto.

In some embodiments, the transmission latency of the data package may be determined by the terminal device based on a non-acknowledgement (NACK) feedback, or determined by the terminal device based on scheduling information of the network device, or determined by the terminal device based on the time of sending the data package and timer time. The timer time may be estimated time of receiving the NACK feedback.

In some embodiments, the NACK feedback may be HARQ NACK, RLC NACK, or PDCP NACK.

In some embodiments, the terminal device may calculate a time difference between the time of sending the data package and the time of receiving the NACK feedback, so as to obtain the transmission latency of the data package.

In some embodiments, the scheduling information may be a New Data Indicator (NDI), which is used to instruct whether to turn over. Turning over represents Acknowledgement (ACK), and not turning over represents NACK. Therefore, when the terminal device determines non-turning over, that is, NACK, based on the scheduling information of the network device, a time difference between the time of sending the data package and the scheduling information may be calculated, so as to obtain the transmission latency of the data package.

In some embodiments, the scheduling information may be a Downlink Feedback Indicator (DFI), which is used to instruct whether to retransmit. NACK means retransmission, and ACK means successful transmission. Therefore, when the terminal device determines NACK based on the DFI information of the network device, the time difference between the time of sending the data package and the scheduling information may be calculated, so as to obtain the transmission latency of the data package.

In some embodiments, the terminal device may determine whether DCI or DFI is received within a period of time T1. The DCI or the DFI is used to indicate that a data package is received. If the terminal device receives the DCI or the DFI within the period of time, it indicates that the network device receives the data package. If the terminal device does not receive the DCI or the DFI within the period of time, it indicates that the network device does not receive the data package. In this case, the terminal device determines that T1 is the transmission latency of the data package.

In some embodiments, the initial time of T1 may be the time of sending the data package.

In some embodiments, the terminal device may determine whether DCI or DFI is received within a period of time T2. The DCI or the DFI is used to indicate that a data package is not received. If the terminal device receives the DCI or the DFI within the period of time, it indicates that the network device does not receive the data package. In this case, the terminal device determines that T2 is the transmission latency of the data package. If the terminal device does not receive the DCI or the DFI within the period of time, it indicates that the network device receives the data package.

In some embodiments, the initial time of T2 may be the time of sending the data package.

In some embodiments, the terminal device may calculate the time difference between the time of sending the data package and the estimated time of receiving the NACK feedback, so as to obtain the transmission latency of the data package.

In some embodiments, the feedback information of the data package may include ACK/NACK feedback and/or the feedback time of ACK/NACK feedback.

In an example, for a DL data package, the terminal device may report the transmission latency of the data package and/or the feedback information of the data package.

For a UL data package, the terminal device may report at least one of followings: the time of sending the data package (including the initial transmission time and/or the retransmission time), or the transmission latency of the data package.

It is to be noted that, such transmission state corresponds to the above 14 transmission states. The transmission state here is equivalent to "a cause", and after the terminal device sends the transmission state here to the network device, the network device may obtain the above 14 transmission states, that is, obtaining "a result".

In some embodiments, regardless of the transmission state here or the above 14 transmission states, the transmission state may further include at least one of followings: a DRB identifier, a QoS flow identifier, a TSN stream identifier, and a PDU session identifier.

In some embodiments, regardless of the transmission state here or the above 14 transmission states, the transmission state may be a transmission state of any one of following levels: a data package level, a terminal device level, a DRB level, a QoS flow level, a PDU session level, and a TSN stream-level data package level.

When the transmission state is at the terminal device level, the DRB level, the QoS flow level, the PDU session level, or the TSN stream-level data package level, the time of sending the data package, the transmission latency or cumulative transmission latency, calculated by the terminal device, of the data package, and the feedback information of the data package may be understood as statistical information for a plurality of data packages, for example, an average value.

To sum up, in the disclosure, processing service transmission by the terminal device may include at least one of followings: selecting a transmission resource that is to be first transmitted; selecting or adjusting a mapping limit parameter of a LCH; selecting or adjusting a mapping parameter of the LCH; selecting or adjusting a transmission parameter; activating a duplicate transmission mode; selecting or adjusting a carrier wave: selecting or adjusting a BWP; determining whether to report a transmission state; and reporting the transmission state. As such the transmission success rate of a communication service can be improved.

The above describes the method embodiments of the disclosure in detail in combination with FIG. 2. The following describes the apparatus embodiments of the disclosure in detail in combination with FIG. 3 to FIG. 7. It should be understood that, the apparatus embodiments mutually correspond to the method embodiments, and for similar descriptions, refer to the method embodiments.

Figure 3:
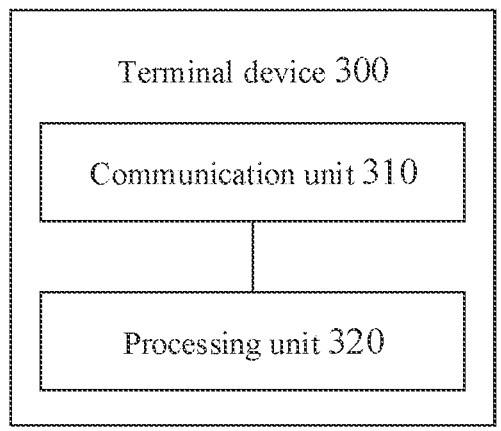
FIG. 3 is a schematic block diagram of a terminal device 300 according to an embodiment of the disclosure.

FIG. 3 is a schematic block diagram of a terminal device 300 according to an embodiment of the disclosure. As shown in FIG. 3, the terminal device 300 includes a communication unit and a processing unit.

The communication unit 310 is configured to receive a survival-time-related parameter of a first service.

The processing unit 320 is configured to process service transmission based on the survival-time-related parameter.

In some embodiments, the survival-time-related parameter may include at least one of followings: a DRB identifier, a QoS flow identifier, a TSN stream identifier, a PDU session identifier, survival time, a preset threshold for the survival time, a burst periodicity, burst arrival time, and a first PDB.

In some embodiments, the processing unit 320 is specifically configured to the following operations.

In response to that the survival time is configured or indicated, the service transmission is processed.

Alternatively, in response to that the survival time is configured or indicated, and the survival time and the preset threshold meet a first preset condition, the service transmission is processed.

Alternatively, in response to that the survival time is configured or indicated, and the survival time, the preset threshold, transmission latency of a data package and the first PDB meet a second preset condition, the service transmission is processed.

Alternatively, in response to that the survival time is configured or indicated, and the survival time, the preset threshold, transmission latency of the service cycle and the first PDB meet a third preset condition, the service transmission is processed.

Alternatively, in response to that the survival time is configured or indicated, and the survival time, the preset threshold, the number of the service cycles and the first PDB meet a fourth preset condition, the service transmission is processed.

Alternatively, in response to that the survival time is configured or indicated, and the survival time, the preset threshold, the transmission latency of the data package within the service cycle and the first PDB meet a fifth preset condition, the service transmission is processed.

Alternatively, in response to that the survival time is configured or indicated, and the survival time, the preset threshold, the number of the data packages and the first PDB meet a sixth preset condition, the service transmission is processed.

In some embodiments, the first preset condition may include any one of followings:
- the survival time equals X service cycles, where X is less than or equal to the preset threshold, or X is greater than or equal to the preset threshold, where X is an integer greater than or equal to 1;
- the survival time equals X service cycles, where the X service cycles are less than or equal to the preset threshold, or the X service cycles are greater than or equal to the preset threshold, where X is an integer greater than or equal to 1:
- the survival time equals a transmission duration of Y continuously incorrect data packages, where Y is less than or equal to the preset threshold, or Y is greater than or equal to the preset threshold, where Y is an integer greater than or equal to 1; and
- the survival time equals Y continuously incorrect data packages, where Y is less than or equal to the preset threshold, or Y is greater than or equal to the preset threshold, where Y is an integer greater than or equal to 1.

In some embodiments, the second preset condition may include any one of followings:
- the survival time equals X service cycles, and the transmission latency of K data packages or K continuous data packages is greater than or equal to the first PDB, where K is greater than or equal to the preset threshold, or K equals X, where X is an integer greater than or equal to 1;
- the survival time equals the transmission duration of Y continuously incorrect data packages, and the transmission latency of K data packages or K continuous data packages is greater than or equal to the first PDB, where K is greater than or equal to the preset threshold, or K is less than or equal to Y, where Y is an integer greater than or equal to 1; and
- the survival time equals Y continuously incorrect data packages, and the transmission latency of K data packages or K continuous data packages is greater than or equal to the first PDB, where K is greater than or equal to the preset threshold, or K is less than or equal to Y, where Y is an integer greater than or equal to 1.

In some embodiments, the third preset condition may include any one of followings:
- the survival time equals X service cycles, and the transmission latency of K service cycles or K continuous service cycles is greater than or equal to the first PDB, where K is greater than or equal to the preset threshold, or K equals X, where X is an integer greater than or equal to 1;
- the survival time equals the transmission duration of Y continuously incorrect data packages, and the transmission latency of K service cycles or K continuous service cycles is greater than or equal to the first PDB, where K is greater than or equal to the preset threshold, or K is less than or equal to Y, where Y is an integer greater than or equal to 1; and
- the survival time equals Y continuously incorrect data packages, and the transmission latency of K service cycles or K continuous service cycles is greater than or equal to the first PDB, where K is greater than or equal to the preset threshold, or K is less than or equal to Y, where Y is an integer greater than or equal to 1.

In some embodiments, the fourth preset condition may include any one of followings:
- the survival time equals X service cycles, and there are K service cycles or K continuous service cycles of which transmission latency is greater than or equal to the first PDB, where K is greater than or equal to the preset threshold, or K equals X, where X is an integer greater than or equal to 1;
- the survival time equals the transmission duration of Y continuously incorrect data packages, and there are K service cycles or K continuous service cycles of which transmission latency is greater than or equal to the first PDB, where K is greater than or equal to the preset threshold, or K is less than or equal to Y, where Y is an integer greater than or equal to 1; and
- the survival time equals Y continuously incorrect data packages, and there are K service cycles or K continuous service cycles of which transmission latency is greater than or equal to the first PDB, where K is greater than or equal to the preset threshold, or K is less than or equal to Y, where Y is an integer greater than or equal to 1.

In some embodiments, the fifth preset condition may include any one of followings:
- the survival time equals X service cycles, and the transmission latency of the data packages within K service cycles or K continuous service cycles is greater than or equal to the first PDB, where K is greater than or equal to the preset threshold, or K equals X, where X is an integer greater than or equal to 1;
- the survival time equals the transmission duration of Y continuously incorrect data packages, and the transmission latency of the data packages within K service cycles or K continuous service cycles is greater than or equal to the first PDB, where K is greater than or equal to the preset threshold, or K is less than or equal to Y, where Y is an integer greater than or equal to 1; and
- the survival time equals Y continuously incorrect data packages, and the transmission latency of the data packages within K service cycles or K continuous service cycles is greater than or equal to the first PDB, where K is greater than or equal to the preset threshold, or K is less than or equal to Y, where Y is an integer greater than or equal to 1.

In some embodiments, the sixth preset condition may include any one of followings:
- the survival time equals X service cycles, and there are K data packages or K continuous data packages of which transmission latency is greater than or equal to the first PDB, where K is greater than or equal to the preset threshold, or K equals X, where X is an integer greater than or equal to 1;
- the survival time equals X service cycles, and there are data packages within K service cycles or K continuous service cycles of which transmission latency is greater than or equal to the first PDB, where K is greater than or equal to the preset threshold, or K equals X, where X is an integer greater than or equal to 1;
- the survival time equals the transmission duration of Y continuously incorrect data packages, and there are K data packages or K continuous data packages of which transmission latency is greater than or equal to the first PDB, where K is greater than or equal to the preset threshold, or K is less than or equal to Y, where Y is an integer greater than or equal to 1; and the survival time equals Y continuously incorrect data packages, and there are K data packages or K continuous data packages of which transmission latency is greater than or equal to the first PDB, where K is greater than or equal to the preset threshold, or K is less than or equal to Y, where Y is an integer greater than or equal to 1.

In some embodiments, the processing unit 320 is specifically configured to implement at least one of followings:

selecting a transmission resource that is to be first transmitted;

selecting or adjusting a mapping limit parameter of an LCH;

selecting or adjusting a mapping parameter of an LCH;

selecting or adjusting a transmission parameter;

activating a duplicate transmission mode;

selecting or adjusting a carrier wave;

selecting or adjusting a BWP;

determining whether to report a transmission state; and reporting the transmission state.

In some embodiments, the transmission resource may include any one of followings: an MAC PDU, a physical-layer transmission resource, and a transmission grant.

In some embodiments, the mapping limit parameter may include any one of followings: a type of the transmission resource, allowedServingCells, allowedCG-List, or allowedPHY-PriorityIndex.

In some embodiments, the mapping parameter may include any one of followings: priority of the LCH, a prioritised bit rate of the LCH, and a BSD of the LCH.

In some embodiments, the transmission parameter may include any one of followings: an MCS, the number of repeated transmissions of the data packages, the number of duplicate transmissions of the data packages, and an indication parameter about whether to use duplicate transmission.

In some embodiments, the processing unit 320 is specifically configured to: take a transmission resource for the first service as the transmission resource that is to be first transmitted; or select, according to a priority rule of the LCH and at least one service that meets the first preset condition, the second preset condition, the third preset condition, the fourth preset condition, the fifth preset condition or the sixth preset condition, the transmission resource that is to be first transmitted.

In some embodiments, the processing unit 320 is specifically configured to: select a transmission resource of a service corresponding to a highest-priority LCH from the at least one service that meets the first preset condition, the second preset condition, the third preset condition, the fourth preset condition, the fifth preset condition or the sixth preset condition as the transmission resource that is to be first transmitted.

In some embodiments, the selected or adjusted mapping limit parameter is used to map the LCH into all transmission resources or a first resource set.

In some embodiments, there may be a correspondence between the LCH and the first resource set.

In some embodiments, the correspondence and/or the first resource set may be pre-configured or indicated by a network device.

In some embodiments, the selected or adjusted mapping parameter may be pre-configured or indicated by a network device.

In some embodiments, the selected or adjusted transmission parameter may be pre-configured or indicated by a network device.

In some embodiments, the duplicate transmission mode may be a transmission mode of any one of following levels: a terminal device level, a DRB level, a QoS flow level, a TSN stream level, and a PDU session level.

In some embodiments, the level of the duplicate transmission mode may be pre-configured or indicated by a network device.

In some embodiments, the transmission state may include at least one of following situations:

the transmission latency of a first data package is greater than or equal to the first PDB;

there is the first data package of which the transmission latency is greater than or equal to the first PDB;

the transmission latency of the K data packages or K continuous data packages is greater than or equal to the first PDB is indicated. K is greater than or equal to the preset threshold for the survival time, or K equals X, where X is the number of the service cycles included in the survival time, where X is an integer greater than or equal to 1;

the transmission latency of the K data packages or K continuous data packages is greater than or equal to the first PDB is indicated. K is greater than or equal to the preset threshold, or K is less than or equal to Y, where Y is the number of the continuously incorrect data packages included in the survival time, where Y is an integer greater than or equal to 1;

the transmission latency of a first service cycle is greater than or equal to the first PDB;

there is the first service cycle of which the transmission latency is greater than or equal to the first PDB;

the transmission latency of the K service cycles or K continuous service cycles is greater than or equal to the first PDB is indicated. K is greater than or equal to the preset threshold for the survival time, or K equals X, where X is the number of the service cycles included in the survival time, where X is an integer greater than or equal to 1;

there are K service cycles or K continuous service cycles of which transmission latency is greater than or equal to the first PDB is indicated. K is greater than or equal to the preset threshold for the survival time, or K equals X, where X is the number of the service cycles included in the survival time, where X is an integer greater than or equal to 1;

transmission latency of a data package within the first service cycle is greater than or equal to the first PDB;

the transmission latency of the data packages within the K service cycles or K continuous service cycles is greater than or equal to the first PDB is indicated. K is greater than or equal to the preset threshold for the survival time, or K equals X, where X is the number of the service cycles included in the survival time, where X is an integer greater than or equal to 1;

there are K data packages or K continuous data packages of which transmission latency is greater than or equal to the first PDB is indicated. K is greater than or equal to the preset threshold, or K equals X, where X is the number of the service cycles included in the survival time, where X is an integer greater than or equal to 1;

there are data packages within K service cycles or K continuous service cycles of which transmission latency is greater than or equal to the first PDB is indicated. K is greater than or equal to the preset threshold, or K equals X, where X is the number of the service cycles included in the survival time, where X is an integer greater than or equal to 1.

there are K data packages or K continuous data packages of which transmission latency is greater than or equal to the first PDB is indicated. K is greater than or equal to the preset threshold, or K is less than or equal to Y, where Y is the number of the continuously incorrect data packages included in the survival time, where Y is an integer greater than or equal to 1;

the first service does not meet a PDB requirement;

the first service does not meet a duration of the first PDB;

the first service does not meet a cumulative duration of the first PDB; and the first service does not meet a survival-time requirement.

In some embodiments, the processing unit 320 is further configured to: in response to determining the transmission latency of the first data package to be greater than or equal to the first PDB, drop the first data package; in response to determining the transmission latency of the K data packages or K continuous data packages to be greater than or equal to the first PDB, drop the K data packages or K continuous data packages; in response to determining the transmission latency of the first service cycle to be greater than or equal to the first PDB, drop the data package of the first service cycle; in response to determining the transmission latency of the K service cycles or K continuous service cycles to be greater than or equal to the first PDB, drop the data packages within the K service cycles or K continuous service cycles; in response to determining transmission latency of a data package within the first service cycle to be greater than or equal to the first PDB, drop the data package of the first service cycle; in response to determining the transmission latency of the data packages within the K service cycles or K continuous service cycles to be greater than or equal to the first PDB, drop the data packages within the K service cycles or K continuous service cycles: in response to determining the first service to not meet the PDB requirement, drop the data package of the first service or drop the data package that does not meet the PDB requirement; in response to determining the first service to not meet the duration of the first PDB, drop the data package of the first service or drop the data package that does not meet the duration of the first PDB; in response to determining the first service to not meet the cumulative duration of the first PDB, drop the data package of the first service or drop the data package that does not meet the cumulative duration of the first PDB; and in response to determining that the survival-time requirement is not met, drop the data package of the first service or drop the data package that does not meet the survival-time requirement.

In some embodiments, the K data packages or K continuous data packages may be data packages of any one of following levels: a terminal device level, a DRB level, a QoS flow level, a TSN stream level, and a PDU session level.

In some embodiments, the data package may be dropped by the terminal device in at least one of following protocol layers: a PDCP layer, an RLC layer, and an MAC layer.

In some embodiments, the transmission state may include at least one of followings: time of sending the data package; transmission latency or cumulative transmission latency, calculated by the terminal device, of the data package; or feedback information of the data package.

In some embodiments, the transmission latency of the data package may be determined by the terminal device based on NACK feedback, or may be determined by the terminal device based on scheduling information of the network device, or may be determined by the terminal device based on the time of sending the data package and timer time. The timer time may be estimated time of receiving the NACK feedback.

In some embodiments, the time of sending may include initial transmission time and/or retransmission time.

In some embodiments, the transmission state may further include at least one of followings: a DRB identifier, a QoS flow identifier, a TSN stream identifier, and a PDU session identifier.

In some embodiments, the transmission state may be a transmission state of any one of following levels: a terminal device level, a DRB level, a QoS flow level, a PDU session level, a TSN stream level, and a data package level.

In some embodiments, the terminal device may process the service transmission at any one of following levels: a terminal device level, a DRB level, a QoS flow level, a PDU session level, a TSN stream level, and a data package level.

In some embodiments, the survival-time-related parameter may be carried in dedicated signaling or a broadcast message.

In some embodiments, the dedicated signaling may be any one of followings: RRC signaling, MAC CE signaling, or DCI.

In some embodiments, the communication unit 310 is further configured to: receive first indication information. The first indication information is used to instruct the terminal device to process the service transmission based on the survival-time-related parameter.

In some embodiments, in some embodiments, the communication unit may be a communication interface or a transceiver, or an input/output interface of a communication chip or system on chip. The processing unit may be one or more processors.

It should be understood that, the terminal device 300 according to the embodiments of the disclosure may correspond to the terminal device in the method embodiments of the disclosure. The above and other operations and/or functions of each unit in the terminal device 300 are corresponding processes that are respectively for implementing the terminal device in the above method embodiments. For the sake of brevity, details are not described herein again.

Figure 4:
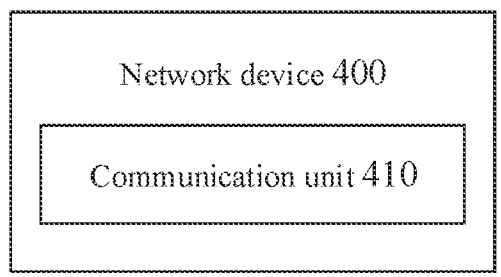
FIG. 4 is a schematic block diagram of a network device 400 according to an embodiment of the disclosure.

FIG. 4 is a schematic block diagram of a network device 400 according to an embodiment of the disclosure. As shown in FIG. 4, the network device 400 includes: a communication unit 410, configured to send a survival-time-related parameter of a first service. The survival-time-related parameter is configured for a terminal device to process service transmission.

In some embodiments, the survival-time-related parameter may include at least one of followings: a DRB identifier, a QoS flow identifier, a TSN stream identifier, a PDU session identifier, survival time, a preset threshold for the survival time, a burst periodicity, burst arrival time, and a first PDB.

In some embodiments, the survival-time-related parameter may be specifically configured to achieve one of the following operations:

in response to that the survival time is configured or indicated, the survival-time-related parameter is configured for the terminal device to process the service transmission; or in response to that the survival time is configured or indicated, and the survival time and the preset threshold meet a first preset condition, the survival-time-related parameter is configured for the terminal device to process the service transmission; or in response to that the survival time is configured or indicated, and the survival time, the preset threshold, transmission latency of a data package and the first PDB meet a second preset condition, the survival-time-related parameter is configured for the terminal device to process the service transmission; or in response to that the survival time is configured or indicated, and the survival time, the preset threshold, transmission latency of the service cycle and the first PDB meet a third preset condition, the survival-time-related parameter is configured for the terminal device to process the service transmission; or in response to that the survival time is configured or indicated, and the survival time, the preset threshold, the number of the service cycles and the first PDB meet a fourth preset condition, the survival-time-related parameter is configured for the terminal device to process the service transmission; or in response to that the survival time is configured or indicated, and the survival time, the preset threshold, the transmission latency of the data package within the service cycle and the first PDB meet a fifth preset condition, the survival-time-related parameter is configured for the terminal device to process the service transmission; or in response to that the survival time is configured or indicated, and the survival time, the preset threshold, the number of the data packages and the first PDB meet a sixth preset condition, the survival-time-related parameter is configured for the terminal device to process the service transmission.

In some embodiments, the first preset condition may include any one of followings:

the survival time equals X service cycles, where X is less than or equal to the preset threshold, or X is greater than or equal to the preset threshold, where X is an integer greater than or equal to 1;

the survival time equals X service cycles, where the X service cycles are less than or equal to the preset threshold, or the X service cycles are greater than or equal to the preset threshold, where X is an integer greater than or equal to 1;

the survival time equals a transmission duration of Y continuously incorrect data packages, where Y is less than or equal to the preset threshold, or Y is greater than or equal to the preset threshold, where Y is an integer greater than or equal to 1; and the survival time equals Y continuously incorrect data packages, where Y is less than or equal to the preset threshold, or Y is greater than or equal to the preset threshold, where Y is an integer greater than or equal to 1.

In some embodiments, the second preset condition may include any one of followings:

the survival time equals X service cycles, and the transmission latency of K data packages or K continuous data packages is greater than or equal to the first PDB, where K is greater than or equal to the preset threshold, or K equals X, where X is an integer greater than or equal to 1;

the survival time equals the transmission duration of Y continuously incorrect data packages, and the transmission latency of K data packages or K continuous data packages is greater than or equal to the first PDB, where K is greater than or equal to the preset threshold, or K is less than or equal to Y, where Y is an integer greater than or equal to 1; and the survival time equals Y continuously incorrect data packages, and the transmission latency of K data packages or K continuous data packages is greater than or equal to the first PDB, where K is greater than or equal to the preset threshold, or K is less than or equal to Y, where Y is an integer greater than or equal to 1.

In some embodiments, the third preset condition may include any one of followings:

the survival time equals X service cycles, and the transmission latency of K service cycles or K continuous service cycles is greater than or equal to the first PDB, where K is greater than or equal to the preset threshold, or K equals X, where X is an integer greater than or equal to 1;

the survival time equals the transmission duration of Y continuously incorrect data packages, and the transmission latency of K service cycles or K continuous service cycles is greater than or equal to the first PDB, where K is greater than or equal to the preset threshold, or K is less than or equal to Y, where Y is an integer greater than or equal to 1; and the survival time equals Y continuously incorrect data packages, and the transmission latency of K service cycles or K continuous service cycles is greater than or equal to the first PDB, where K is greater than or equal to the preset threshold, or K is less than or equal to Y, where Y is an integer greater than or equal to 1.

In some embodiments, the fourth preset condition may include any one of followings:

the survival time equals X service cycles, and there are K service cycles or K continuous service cycles of which transmission latency is greater than or equal to the first PDB, where K is greater than or equal to the preset threshold, or K equals X, where X is an integer greater than or equal to 1;

the survival time equals the transmission duration of Y continuously incorrect data packages, and there are K service cycles or K continuous service cycles of which transmission latency is greater than or equal to the first PDB, where K is greater than or equal to the preset threshold, or K is less than or equal to Y, where Y is an integer greater than or equal to 1; and the survival time equals Y continuously incorrect data packages, and there are K service cycles or K continuous service cycles of which transmission latency is greater than or equal to the first PDB, where K is greater than or equal to the preset threshold, or K is less than or equal to Y, where Y is an integer greater than or equal to 1.

In some embodiments, the fifth preset condition may include any one of followings:

the survival time equals X service cycles, and the transmission latency of the data packages within K service cycles or K continuous service cycles is greater than or equal to the first PDB, where K is greater than or equal to the preset threshold, or K equals X, where X is an integer greater than or equal to 1;

the survival time equals the transmission duration of Y continuously incorrect data packages, and the transmission latency of the data packages within K service cycles or K continuous service cycles is greater than or equal to the first PDB, where K is greater than or equal to the preset threshold, or K is less than or equal to Y, where Y is an integer greater than or equal to 1; and the survival time equals Y continuously incorrect data packages, and the transmission latency of the data packages within K service cycles or K continuous service cycles is greater than or equal to the first PDB, where K is greater than or equal to the preset threshold, or K is less than or equal to Y, where Y is an integer greater than or equal to 1.

In some embodiments, the sixth preset condition may include any one of followings:

the survival time equals X service cycles, and there are K data packages or K continuous data packages of which transmission latency is greater than or equal to the first PDB, where K is greater than or equal to the preset threshold, or K equals X, where X is an integer greater than or equal to 1;

the survival time equals X service cycles, and there are data packages within K service cycles or K continuous service cycles of which transmission latency is greater than or equal to the first PDB, where K is greater than or equal to the preset threshold, or K equals X, where X is an integer greater than or equal to 1;

the survival time equals the transmission duration of Y continuously incorrect data packages, and there are K data packages or K continuous data packages of which transmission latency is greater than or equal to the first PDB, where K is greater than or equal to the preset threshold, or K is less than or equal to Y, where Y is an integer greater than or equal to 1; and the survival time equals Y continuously incorrect data packages, and there are K data packages or K continuous data packages of which transmission latency is greater than or equal to the first PDB, where K is greater than or equal to the preset threshold, or K is less than or equal to Y, where Y is an integer greater than or equal to 1.

In some embodiments, the processing of the service transmission by the terminal device may include at least one of followings:

selecting, by the terminal device, a transmission resource that is to be first transmitted;

selecting or adjusting, by the terminal device, a mapping limit parameter of the LCH;

selecting or adjusting, by the terminal device, a mapping parameter of the LCH;

selecting or adjusting, by the terminal device, a transmission parameter;

activating, by the terminal device, a duplicate transmission mode;

selecting or adjusting, by the terminal device, a carrier wave;

selecting or adjusting, by the terminal device, a BWP;

determining, by the terminal device, whether to report a transmission state; and reporting, by the terminal device, the transmission state.

In some embodiments, the transmission resource may include any one of followings: an MAC PDU, a physical-layer transmission resource, and a transmission grant.

In some embodiments, the mapping limit parameter may include any one of followings: the type of the transmission resource, allowedServingCells, allowedCG-List, and allowedPHY-PriorityIndex.

In some embodiments, the mapping parameter may include any one of followings: priority of the LCH, a prioritised bit rate of the LCH, and a BSD of the LCH.

In some embodiments, the transmission parameter may include any one of followings: an MCS, the number of repeated transmissions of the data packages, the number of duplicate transmissions of the data packages, and an indication parameter about whether to use duplicate transmission.

In some embodiments, the selected or adjusted mapping limit parameter is used to map the LCH into all transmission resources or a first resource set.

In some embodiments, there may be a correspondence between the LCH and the first resource set.

In some embodiments, the correspondence and/or the first resource set may be pre-configured or indicated by the network device.

In some embodiments, the selected or adjusted mapping parameter may be pre-configured or indicated by the network device.

In some embodiments, the selected or adjusted transmission parameter may be pre-configured or indicated by the network device.

In some embodiments, the duplicate transmission mode may be a transmission mode of any one of following levels: a terminal device level, a DRB level, a QoS flow level, a TSN stream level, and a PDU session level.

In some embodiments, the level of the duplicate transmission mode may be pre-configured or indicated by the network device.

In some embodiments, the transmission state may include at least one of following situations:

the transmission latency of a first data package is greater than or equal to the first PDB;

there is the first data package of which the transmission latency is greater than or equal to the first PDB;

the transmission latency of the K data packages or K continuous data packages is greater than or equal to the first PDB is indicated. K is greater than or equal to the preset threshold for the survival time, or K equals X, where X is the number of the service cycles included in the survival time, where X is an integer greater than or equal to 1;

the transmission latency of the K data packages or K continuous data packages is greater than or equal to the first PDB is indicated. K is greater than or equal to the preset threshold, or K is less than or equal to Y, where Y is the number of the continuously incorrect data packages included in the survival time, where Y is an integer greater than or equal to 1;

the transmission latency of a first service cycle is greater than or equal to the first PDB;

there is the first service cycle of which the transmission latency is greater than or equal to the first PDB;

the transmission latency of the K service cycles or K continuous service cycles is greater than or equal to the first PDB is indicated. K is greater than or equal to the preset threshold for the survival time, or K equals X, where X is the number of the service cycles included in the survival time, where X is an integer greater than or equal to 1;

there are K service cycles or K continuous service cycles of which transmission latency is greater than or equal to the first PDB is indicated. K is greater than or equal to the preset threshold for the survival time, or K equals X, where X is the number of the service cycles included in the survival time, where X is an integer greater than or equal to 1;

transmission latency of a data package within the first service cycle is greater than or equal to the first PDB;

the transmission latency of the data packages within the K service cycles or K continuous service cycles is greater than or equal to the first PDB is indicated. K is greater than or equal to the preset threshold for the survival time, or K equals X, where X is the number of the service cycles included in the survival time, where X is an integer greater than or equal to 1;

there are K data packages or K continuous data packages of which transmission latency is greater than or equal to the first PDB is indicated. K is greater than or equal to the preset threshold, or K equals X, where X is the number of the service cycles included in the survival time, where X is an integer greater than or equal to 1;

there are data packages within K service cycles or K continuous service cycles of which transmission latency is greater than or equal to the first PDB is indicated. K is greater than or equal to the preset threshold, or K equals X, where X is the number of the service cycles included in the survival time, where X is an integer greater than or equal to 1;

there are K data packages or K continuous data packages of which transmission latency is greater than or equal to the first PDB is indicated. K is greater than or equal to the preset threshold, or K is less than or equal to Y, where Y is the number of the continuously incorrect data packages included in the survival time, where Y is an integer greater than or equal to 1;

the first service does not meet a PDB requirement;

the first service does not meet a duration of the first PDB;

the first service does not meet a cumulative duration of the first PDB; and the first service does not meet a survival-time requirement.

In some embodiments, the transmission state may include at least one of followings: time of sending the data package; transmission latency or cumulative transmission latency, calculated by the terminal device, of the data package; and feedback information of the data package.

In some embodiments, the transmission latency of the data package may be determined by the terminal device based on NACK feedback, or may be determined by the terminal device based on scheduling information of the network device, or may be determined by the terminal device based on the time of sending the data package and timer time. The timer time is estimated time of receiving the NACK feedback.

In some embodiments, the time of sending may include initial transmission time and/or retransmission time.

In some embodiments, the transmission state may further include at least one of followings: a DRB identifier, a QoS flow identifier, a TSN stream identifier, and a PDU session identifier.

In some embodiments, the transmission state may be a transmission state of any one of following levels: a terminal device level, a DRB level, a QoS flow level, a PDU session level, a TSN stream level, and a data package level.

In some embodiments, the terminal device may process the service transmission at any one of following levels: a terminal device level, a DRB level, a QoS flow level, a PDU session level, a TSN stream level, and a data package level.

In some embodiments, the survival-time-related parameter may be carried in dedicated signaling or a broadcast message.

In some embodiments, the dedicated signaling may be any one of followings: RRC signaling, MAC CE signaling, or DCI.

In some embodiments, the communication unit 310 is further configured to: send first indication information. The first indication information is configured to instruct the terminal device to process the service transmission based on the survival-time-related parameter.

In some embodiments, in some embodiments, the communication unit may be a communication interface or a transceiver, or an input/output interface of a communication chip or system on chip. The processing unit may be one or more processors.

It should be understood that, the network device 400 according to the embodiments of the disclosure may correspond to the network device in the method embodiments of the disclosure. The above and other operations and/or functions of each unit in the network device 400 are corresponding processes that are respectively for implementing the network device in the above method embodiments. For the sake of brevity, details are not described herein again.

Figure 5:
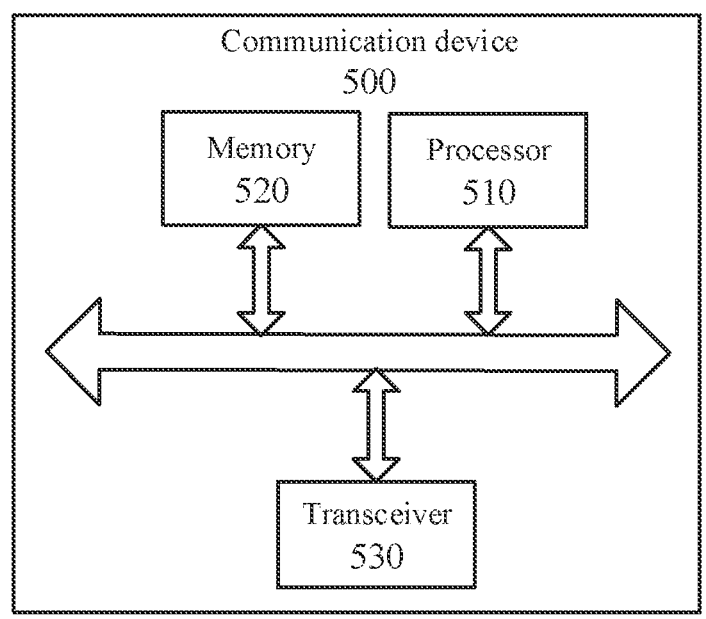
FIG. 5 is a schematic structural diagram of a communication device 500 according to an embodiment of the disclosure.

FIG. 5 is a schematic structural diagram of a communication device 500 according to an embodiment of the disclosure. The communication device 500 shown in FIG. 5 includes a processor 510. The processor 510 may call and run a computer program in a memory, so as to implement the method in the embodiments of the disclosure.

In some embodiments, as shown in FIG. 5, the communication device 500 may further include the memory 520. The processor 510 may invoke and run the computer program in the memory 520 to implement the method in the embodiments of the disclosure.

The memory 520 may be an independent device independent of the processor 510 and may also be integrated into the processor 510.

In some embodiments, as shown in FIG. 5, the communication device 500 may further include a transceiver 530. The processor 510 may control the transceiver 530 to communicate with another device, specifically transmitting information or data to another device or receiving information or data transmitted by another device.

The transceiver 530 may include a transmitter and a receiver. The transceiver 530 may further include antennae, and there may be one or more antennae.

In some embodiments, the communication device 500 may specifically be a network device in the embodiment of the disclosure. The communication device 500 may implement corresponding flows implemented by the network device in each method of the embodiments of the disclosure. For simplicity, elaborations are omitted herein.

In some embodiments, the communication device 500 may specifically be a terminal device in the embodiments of the disclosure. The communication device 500 may implement corresponding processes implemented by the terminal device in each method of the embodiments of the disclosure. For simplicity, elaborations are omitted herein.

Figure 6:
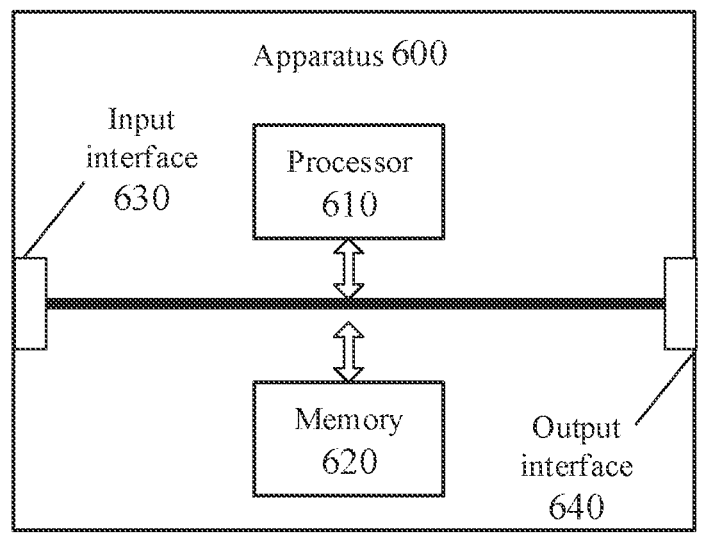
FIG. 6 is a schematic structural diagram of an apparatus according to an embodiment of the disclosure.

FIG. 6 is a schematic structural diagram of an apparatus according to an embodiment of the disclosure. The apparatus 600 shown in FIG. 6 includes a processor 610. The processor 610 may invoke and run a computer program in a memory to implement the method in the embodiments of the disclosure.

In some embodiments, as shown in FIG. 6, the apparatus 600 may further include the memory 620. The processor 610 may invoke and run the computer program in the memory 620 to implement the method in the embodiments of the disclosure.

The memory 620 may be an independent device independent of the processor 610 and may also be integrated into the processor 610.

In some embodiments, the apparatus 600 may further include an input interface 630. The processor 610 may control the input interface 630 to communicate with another device or chip, specifically acquiring information or data transmitted by another device or chip.

In some embodiments, the apparatus 600 may further include an output interface 640. The processor 610 may control the output interface 640 to communicate with another device or chip, specifically outputting information or data transmitted by another device or chip.

In some embodiments, the apparatus is applicable to the network device in the embodiments of the disclosure, and the apparatus may implement corresponding flows implemented by the network device in each method of the embodiments of the disclosure. For simplicity, elaborations are omitted herein.

In some embodiments, the apparatus is applicable to the terminal device in the embodiments of the disclosure, and the apparatus may implement corresponding flows implemented by the terminal device in each method of the embodiments of the disclosure. For simplicity, elaborations are omitted herein.

In some embodiments, the apparatus provided in the embodiments of the disclosure may also be a chip, for example, a system-level chip, a system chip, a chip system, or a system on chip.

Figure 7:
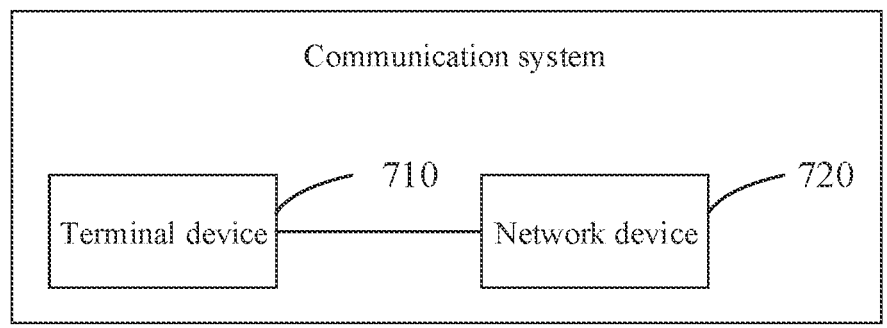
FIG. 7 is a schematic block diagram of a communication system 700 according to an embodiment of the disclosure.

FIG. 7 is a schematic block diagram of a communication system 700 according to an embodiment of the disclosure. As shown in FIG. 7, the communication system 700 includes a terminal device 710 and a network device 720.

The terminal device 710 may be configured to implement corresponding functions implemented by the terminal device in the above method. The network device 720 may be configured to implement the corresponding functions implemented by the network device or the base station in the above method. For simplicity, elaborations are omitted herein.

It is to be understood that the processor in the embodiment of the disclosure may be an integrated circuit chip and has a signal processing capacity. During implementation, each operation of the method embodiments may be completed by an integrated logical circuit of hardware in the processor or an instruction in a software form. The above processor may be a general processor, a Digital Signal Processor (DSP), an Application Specific Integrated Circuit (ASIC), a Field-Programmable Gate Array (FPGA) or other programmable logic devices, discrete gate or transistor logic devices, and discrete hardware components. Each method, operation and logical block diagram disclosed in the embodiments of the disclosure may be implemented or executed. The general processors may be microprocessors or the processor may also be any conventional processors. In combination with the method disclosed in the embodiments of the disclosure, the operations may be directly implemented by a hardware processor, or may be performed by a combination of hardware and software modules in the decoding processor. The software module may be located in a mature storage medium in the field such as a Random Access Memory (RAM), a flash memory, a Read-Only Memory (ROM), a Programmable ROM (PROM) or Electrically Erasable PROM (EEPROM), and a register. The storage medium is located in a memory, and the processor reads information in the memory, and completes the operations of the method in combination with hardware.

It is to be understood that the memory in the embodiment of the disclosure may be a volatile memory or a non-volatile memory, or may include both the volatile and non-volatile memories. The non-volatile memory may be an ROM, a PROM, an Erasable PROM (EPROM), an EEPROM or a flash memory. The volatile memory may be an RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that, the above memory is exemplarily but unlimitedly described that the memory in the embodiments of the disclosure may be as SRAM, a DRAM, an SDRAM, a DDR SDRAM, an ESDRAM, an SLDRAM, and a DR RAM. That is to say, the memory in the embodiments of the disclosure is intended to include, but not limited to, memories of these and any other proper types.

An embodiment of the disclosure further provides a computer-readable storage medium, configured to store a computer program.

In some embodiments, the computer-readable storage medium is applicable to a network device or a base station in the embodiments of the disclosure, and the computer program causes a computer to execute corresponding flows implemented by the network device or a base station in each method of the embodiments of the disclosure. For simplicity, elaborations are omitted herein.

In some embodiments, the computer-readable storage medium is applicable to a mobile terminal/terminal device in the embodiments of the disclosure, and the computer program causes a computer to execute corresponding flows implemented by the mobile terminal/terminal device in each method of the embodiments of the disclosure. For simplicity, elaborations are omitted herein.

An embodiment of the disclosure further provides a computer program product, including a computer program instruction.

In some embodiments, the computer program product is applicable to a network device or a base station in the embodiments of the disclosure, and the computer program causes a computer to execute corresponding flows implemented by the network device or a base station in each method of the embodiments of the disclosure. For simplicity, elaborations are omitted herein.

In some embodiments, the computer program product is applicable to a mobile terminal/terminal device in the embodiments of the disclosure, and the computer program instruction causes a computer to execute corresponding flows implemented by the mobile terminal/terminal device in each method of the embodiments of the disclosure. For simplicity, elaborations are omitted herein.

An embodiment of the disclosure further provides a computer program.

In some embodiments, the computer program is applicable to a network device or a base station in the embodiments of the disclosure. When the computer program is run on a computer, the computer executes corresponding flows implemented by the network device or a base station in each method of the embodiments of the disclosure. For simplicity, elaborations are omitted herein.

In some embodiments, the computer program is applicable to a mobile terminal/terminal device in the embodiments of the disclosure. When the computer program is run on a computer, the computer executes corresponding flows implemented by the mobile terminal/terminal device in each method of the embodiments of the disclosure. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such implementation shall fall within the scope of this disclosure.

Those skilled in the art may clearly learn about that specific working processes of the system, device, and units described above may refer to the corresponding processes in the above method embodiments and will not be elaborated herein for ease and briefness of description.

In several embodiments provided by the disclosure, it is to be understood that the disclosed system, apparatus and method may be implemented in other ways. For example, the device embodiment described above is only schematic, and for example, division of the units is only logic function division, and other division manners may be adopted during practical implementation. For another example, a plurality of units or components may be combined or integrated into another system, or some characteristics may be neglected or not executed. In addition, the displayed or discussed mutual coupling or direct coupling or communication connection may be indirect coupling or communication connection through some interfaces, devices or units, and may be in electrical, mechanical or other forms.

The units described as separate components may or may not be physically separated. The components displayed as units may or may not be physical units, that is, the components may be located in one place, or may be distributed on the plurality of network units. Part or all of the units may be selected according to actual requirements to achieve the purposes of the solutions of this embodiment.

In addition, the functional units in the various embodiments of the disclosure may be integrated into one processing unit, or each unit may exist alone physically, or two or more than two units may be integrated into one unit.

If the function is implemented in the form of the software functional unit and sold or used as an independent product, it can be stored in the computer readable storage medium. Based on this understanding, the technical solutions in the disclosure essentially or the parts that contribute to the prior art, or part of the technical solutions can be embodied in the form of a software product. The computer software product is stored in a storage medium, including a plurality of instructions for causing a computer device (which may be a personal computer, a server, or a network device, and the like) to execute all or part of the operations of the method described in the various embodiments of the disclosure. The storage medium includes: various media capable of storing program codes such as a U disk, a mobile Hard Disk Drive (HDD), a Read-Only Memory (ROM), a Random Access Memory (RAM), a magnetic disk or an optical disk.

The above is only the specific implementations of the disclosure and not intended to limit the scope of protection of the disclosure. Any variations or replacements apparent to those skilled in the art within the technical scope disclosed by the disclosure shall fall within the scope of protection of the disclosure. Therefore, the protection scope of the disclosure shall be subject to the protection scope of the claims.

The invention claimed is:

1. A wireless communication method, comprising:
receiving, by a terminal device, a survival-time-related parameter of a first service; and
processing, by the terminal device, service transmission based on the survival-time-related parameter,
wherein the survival-time-related parameter comprises a data radio bear (DRB) identifier,
wherein the processing, by the terminal device, service transmission comprises:
activating, by the terminal device, a duplicate transmission mode,
wherein the service transmission is processed by the terminal device at a DRB level.

2. The method of claim 1, wherein the processing, by the terminal device, service transmission based on the survival-time-related parameter comprises:
in response to that the survival time is configured or indicated, processing the service transmission by the terminal device.

3. A communication device, comprising:
a transceiver, configured to receive a survival-time-related parameter of a first service; and
a processor, configured to process service transmission based on the survival-time-related parameter,
wherein the survival-time-related parameter comprises a data radio bear (DRB) identifier,
wherein the processor is further configured to activate a duplicate transmission mode,
wherein the service transmission is processed by the terminal device at a DRB level.

4. The communication device of claim 3, wherein the processor is further configured to:
in response to that the survival time is configured or indicated, process the service transmission.

5. A communication device, comprising:
a transceiver, configured to send a survival-time-related parameter of a first service,
wherein the survival-time-related parameter is configured for a terminal device to process service transmission,
wherein the survival-time-related parameter comprises a data radio bear (DRB) identifier,
wherein the survival-time-related parameter is configured for the terminal device to process the service transmission by activating a duplicate transmission mode,
wherein the service transmission is processed at a DRB level.

6. The communication device of claim 5, wherein the survival-time-related parameter comprises survival time,
in response to that the survival time is configured or indicated, the survival-time-related parameter is configured for the terminal device to process the service transmission.

7. The communication device of claim 5, wherein the transceiver is further configured to:
send first indication information,
wherein the first indication information is configured to instruct the terminal device to process the service transmission based on the survival-time-related parameter.

8. The communication device of claim 6, wherein the survival-time-related parameter further comprises a preset threshold for the survival time,
wherein in response to that the survival time is configured or indicated, and the survival time and the preset threshold meet a first preset condition, the survival-time-related parameter is configured for the terminal device to process the service transmission,
wherein the first preset condition comprises any one of followings:

the survival time equals X service cycles, wherein X is less than or equal to the preset threshold, or X is greater than or equal to the preset threshold, where X is an integer greater than or equal to 1;

the survival time equals X service cycles, wherein the X service cycles are less than or equal to the preset threshold, or the X service cycles are greater than or equal to the preset threshold, where X is an integer greater than or equal to 1;

the survival time equals a transmission duration of Y continuously incorrect data packages, wherein Y is less than or equal to the preset threshold, or Y is greater than or equal to the preset threshold, where Y is an integer greater than or equal to 1; and the survival time equals Y continuously incorrect data packages, wherein Y is less than or equal to the preset threshold, or Y is greater than or equal to the preset threshold, where Y is an integer greater than or equal to 1.

9. The communication device of claim 6, wherein the survival-time-related parameter further comprises a preset threshold for the survival time and a first packet delay budget (PDB), wherein in response to that the survival time is configured or indicated, and the survival time, the preset threshold, transmission latency of a data package and the first PDB meet a second preset condition, the survival-time-related parameter is configured for the terminal device to process the service transmission, wherein the second preset condition comprises any one of followings:

the survival time equals X service cycles, and transmission latency of K data packages or K continuous data packages is greater than or equal to the first PDB, wherein K is greater than or equal to the preset threshold, or K equals X, where X is an integer greater than or equal to 1;

the survival time equals a transmission duration of Y continuously incorrect data packages, and transmission latency of K data packages or K continuous data packages is greater than or equal to the first PDB, wherein K is greater than or equal to the preset threshold, or K is less than or equal to Y, where Y is an integer greater than or equal to 1; and the survival time equals Y continuously incorrect data packages, and transmission latency of K data packages or K continuous data packages is greater than or equal to the first PDB, wherein K is greater than or equal to the preset threshold, or K is less than or equal to Y, where Y is an integer greater than or equal to 1.

10. The communication device of claim 6, wherein the survival-time-related parameter further comprises a preset threshold for the survival time and a first packet delay budget (PDB), wherein in response to that the survival time is configured or indicated, and the survival time, the preset threshold, transmission latency of a service cycle and the first PDB meet a third preset condition, the survival-time-related parameter is configured for the terminal device to process the service transmission, wherein the third preset condition comprises any one of followings:

the survival time equals X service cycles, and transmission latency of K service cycles or K continuous service cycles is greater than or equal to the first PDB, wherein K is greater than or equal to the preset threshold, or K equals X, where X is an integer greater than or equal to 1;

the survival time equals a transmission duration of Y continuously incorrect data packages, and transmission latency of K service cycles or K continuous service cycles is greater than or equal to the first PDB, wherein K is greater than or equal to the preset threshold, or K is less than or equal to Y, where Y is an integer greater than or equal to 1; and the survival time equals Y continuously incorrect data packages, and transmission latency of K service cycles or K continuous service cycles is greater than or equal to the first PDB, wherein K is greater than or equal to the preset threshold, or K is less than or equal to Y, where Y is an integer greater than or equal to 1.

11. The communication device of claim 6, wherein the survival-time-related parameter further comprises a preset threshold for the survival time and a first packet delay budget (PDB), wherein in response to that the survival time is configured or indicated, and the survival time, the preset threshold, a number of service cycles and the first PDB meet a fourth preset condition, the survival-time-related parameter is configured for the terminal device to process the service transmission, wherein the fourth preset condition comprises any one of followings:

the survival time equals X service cycles, and there are K service cycles or K continuous service cycles of which transmission latency is greater than or equal to the first PDB, wherein K is greater than or equal to the preset threshold, or K equals X, where X is an integer greater than or equal to 1;

the survival time equals a transmission duration of Y continuously incorrect data packages, and there are K service cycles or K continuous service cycles of which transmission latency is greater than or equal to the first PDB, wherein K is greater than or equal to the preset threshold, or K is less than or equal to Y, where Y is an integer greater than or equal to 1; and the survival time equals Y continuously incorrect data packages, and there are K service cycles or K continuous service cycles of which transmission latency is greater than or equal to the first PDB, wherein K is greater than or equal to the preset threshold, or K is less than or equal to Y, where Y is an integer greater than or equal to 1.

12. The communication device of claim 6, wherein the survival-time-related parameter further comprises a preset threshold for the survival time and a first packet delay budget (PDB), wherein in response to that the survival time is configured or indicated, and the survival time, the preset threshold, transmission latency of a data package within a service cycle and the first PDB meet a fifth preset condition, the survival-time-related parameter is configured for the terminal device to process the service transmission, wherein the fifth preset condition comprises any one of followings:

the survival time equals X service cycles, and transmission latency of data packages within K service cycles or K continuous service cycles is greater than or equal to the first PDB, wherein K is greater than or equal to the preset threshold, or K equals X, where X is an integer greater than or equal to 1;

the survival time equals a transmission duration of Y continuously incorrect data packages, and transmission latency of data packages within K service cycles or K continuous service cycles is greater than or equal to the first PDB, wherein K is greater than or equal to the preset threshold, or K is less than or equal to Y, where Y is an integer greater than or equal to 1; and the survival time equals Y continuously incorrect data packages, and transmission latency of data packages within K service cycles or K continuous service cycles is greater than or equal to the first PDB, wherein K is greater than or equal to the preset threshold, or K is less than or equal to Y, where Y is an integer greater than or equal to 1.

* * * * *